Patented Sept. 17, 1935

2,014,381

UNITED STATES PATENT OFFICE 2,014,381

ESTER OF ISOBUTYRIC ACID

Emmette F. Izard, Elsmere, Del., assignor to Dupont Viscoloid Company, Wilmington, Del., a corporation of Delaware No Drawing. Application July 21, 1934, Serial No. 736,345

6 Claims. (Cl. 260—106)

This invention relates to polyhydric ether alcohol esters of isobutyric acid and the preparation of same.

An object of the present invention is to provide a new class of esters. A further object is to provide a process of preparing polyhydric ether alcothol esters of isobutyric acid, particularly diethylene glycol di-isobutyrate. Other objects of the invention will be apparent from the description given hereinafter.

The above objects are accomplished according to the present invention by reacting a polyhydric ether alcohol, or an ester thereof, with isobutyric acid, or an ester of such acid, to form an ester of the alcohol with the acid.

These esters may be prepared by reacting the polyhydric ether alcohol with isobutyric acid at a temperature sufficiently high to expel water formed by the reaction at substantially the rate it is formed, and/or using a catalyst such as sulphuric acid, and/or using a solvent such as toluene or ethylene dichloride, to aid in removing the water. Alternatively, these esters may be prepared by reacting the alkali metal salts of isobutyric acid, such as the sodium or potassium salts, with a chloride of the polyhydric ether alcohol, or by reacting a simple ester of the polyhydric ether alcohol with isobutyric acid, or by reacting a simple ester of isobutyric acid with the polyhydric ether alcohol and removing the acid or alcohol, as the case may be, formed by the reaction. Also the esters may be prepared by a simple ester interchange employing an ester of isobutyric acid and an ester of the polyhydric ether alcohol.

It is preferred to use an excess molecular proportion of isobutyric acid and to keep the reaction temperature above the boiling point of water, or the binary mixture of water and solvent, where a solvent is employed, or the boiling point of the acid or alcohol formed by the reaction where a simple ester of the ether alcohol or isobutyric acid is employed, or above the boiling point of the byproduct ester where a simple ester interchange reaction is being carried out. Obviously, the temperature should not exceed the boiling point of the ester being prepared and, in view of the high boiling point of the esters of the present invention, there is little danger of this.

The following examples are given to illustrate the preparation of the esters according to the present invention:—

*Example 1.*—Diethylene glycol di-isobutyrate: A mixture containing 318 grams of diethylene glycol, 616 grams of isobutyric acid, 375 grams of ethylene dichloride, and 10 grams of sulphuric acid, was heated to boiling in an apparatus designed to separate the water from the distillate and return the ethylene dichloride to the reaction flask. When the theoretical amount of water had been removed, the product was washed with dilute sodium carbonate solution to remove excess acid and then vacuum distilled. The product boiled from 150-160° C. at 20 mm. pressure.

*Example 2.*—Diethylene glycol di-isobutyrate:—A mixture of 1280 grams of diethylene glycol and 3090 grams of isobutyric acid was heated to boiling in the apparatus described in Example 1. The binary mixture of water and isobutyric acid distilled over at 98° C., separated into two layers, and the isobutyric acid was returned to the reaction flask while the water was drawn off. The distillation was continued until the theoretical amount of water was removed and the temperature at the top of the distillation column had risen to 145° C. The excess isobutyric acid was then distilled under vacuum and the resulting product steamed under 50 mm. pressure at 130° C. for 1 hour to remove the last traces of acid. The product was then treated with decolorizing carbon, stirred for 3 hours, and then filtered, yielding a very light colored liquid. If preferred, this example may be carried out by adding the decolorizing carbon to the original charge in the apparatus, in which case a water white material is obtained.

It will be understood that the above examples are merely illustrative of one convenient method of preparing a specific ester coming within the class of esters of the present invention, which includes the polyhydric ether alcohol esters of isobutyric acid. In place of diethylene glycol in the above examples, may be used other polyethylene glycols such as triethylene glycols, or other polyglycols such as dipropylene glycol, dibutylene glycol, and the like. Polyglycerols may also be used, as well as the mono-alkyl, aryl, or aralkyl ethers of glycerol, and other polyalcohols.

The polyhydric ether alcohol esters of isobutyric acid have been found to be soluble in the usual organic solvents and compatible with cellulose derivatives and/or resins. They are all light colored or water white liquids of relatively high boiling points and, accordingly, are suitable for use as plasticizers in the formulation of lacquers and enamels, dopes, or plastic compositions based on cellulose derivatives, and/or resins and oils. Cellulose derivatives with which these esters are useful include cellulose nitrate, cellulose acetate, cellulose propionate, cellulose butyrate, cellulose isobutyrate, mixed cellulose esters such as cellulose acetate butyrate, cellulose acetate isobutyrate, cellulose nitroacetate, and the cellulose ethers such as methyl cellulose, ethyl cellulose, butyl cellulose, and the like. The esters of the present invention are also useful in combination with natural and synthetic resins such as polybasic acid-polyhydric alcohol resins, polymerized vinyl resins, phenol formaldehyde resins, damar, shellac, and the like. These esters may be used alone or in admixture with other plasticizers in the formulation of coating and plastic compositions.

It will be understood that the preparation of these esters is not limited to the methods shown in the specific examples but they may be prepared in the various ways indicated above. Although any polyhydric ether alcohol ester may be used to esterify the isobutyric acid according to the present invention, it has been found that, in general, polyglycols such as diethylene glycol and triethylene glycol are preferable, and diethylene glycol di-isobutyrate has proved the most useful ester as a plasticizer for compositions such as mentioned above. These esters have a particular utility in the formulation of plastic compositions because they give unusually tough compositions even when used in large amounts. Although some of these esters are appreciably volatile and water soluble, they have nevertheless been found satisfactory in coating and plastic compositions for many uses. The isobutyrates of the present invention, and specifically diethylene glycol di-isobutyrate, are particularly useful as plasticizers in cellulose acetate, due to their compatibility therewith, thus distinguishing these esters from the analogous esters of normal butyric acid, which latter esters are characterized by a poor compatibility for cellulose acetate.

As many apparently widely different embodiments of this invention may be made without departing from the spirit and scope thereof, it is to be understood that the invention is not limited to the specific embodiments thereof except as defined in the appended claims.

I claim:

1. An ester consisting of a polyhydric ether alcohol from the group consisting of polyglycols and polyglycerols containing at least two hydroxyl groups, in which ether alcohol all of the hydroxyl groups have been esterified with isobutyric acid.

2. A di-isobutyrate of a polyglycol.

3. A di-isobutyrate of a polyethylene glycol.

4. Diethylene glycol di-isobutyrate.

5. Process of preparing an ester comprising heating to reaction temperature a polyhydric ether alcohol from the group consisting of polyglycols and polyglycerols containing at least two hydroxyl groups with sufficient isobutyric acid to react with all the hydroxyl groups, and removing the water formed by the reaction from the reaction zone at substantially the rate it is formed until the alcohol is substantially completely esterified.

6. Process of preparing an ester comprising heating to reaction temperature diethylene glycol with sufficient isobutyric acid to react with all the hydroxyl groups, and removing the water formed by the reaction from the reaction zone at substantially the rate it is formed until the diethylene glycol is substantially completely esterified.

EMMETTE F. IZARD.